(12) United States Patent
Liu

(10) Patent No.: US 9,977,301 B2
(45) Date of Patent: May 22, 2018

(54) ARRAY SUBSTRATE, DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Yuanfu Liu, Guangdong (CN)

(73) Assignee: Wuhan China Star Optoelectronics Technology Co., Ltd, Wuhan Hubei (CN)

( * ) Notice: Subject to any disclaimer, the term of this patent is extended or adjusted under 35 U.S.C. 154(b) by 213 days.

(21) Appl. No.: 15/108,299

(22) PCT Filed: May 4, 2016

(86) PCT No.: PCT/CN2016/080988
§ 371 (c)(1),
(2) Date: Jun. 25, 2016

(87) PCT Pub. No.: WO2017/143660
PCT Pub. Date: Aug. 31, 2017

(65) Prior Publication Data
US 2018/0101075 A1    Apr. 12, 2018

(30) Foreign Application Priority Data

Feb. 23, 2016 (CN) .......................... 2016 1 0098282

(51) Int. Cl.
*G02F 1/1362* (2006.01)
*G02F 1/1368* (2006.01)
*G02F 1/1343* (2006.01)

(52) U.S. Cl.
CPC ...... *G02F 1/136213* (2013.01); *G02F 1/1368* (2013.01); *G02F 1/136209* (2013.01);
(Continued)

(58) Field of Classification Search
CPC ......... G02F 1/136213; G02F 1/136227; G02F 1/1368; G02F 1/1362; G02F 1/136286;
(Continued)

(56) References Cited

U.S. PATENT DOCUMENTS 7,768,015 B2 *  8/2010  Huang .................... H01L 28/40
                                                             257/72
2007/0126942 A1 *  6/2007  Ishii .................. G02F 1/136213
                                                             349/38

(Continued)

FOREIGN PATENT DOCUMENTS

CN           1996594 A    7/2007
CN         101109881 A    1/2008
(Continued)

*Primary Examiner* — Benjamin Sandvik
*Assistant Examiner* — Gustavo Ramallo
(74) *Attorney, Agent, or Firm* — Andrew C. Cheng

(57) ABSTRACT

The present invention discloses an array substrate, comprising a first storage capacitor and a second storage capacitor, and the first storage capacitor and the second storage capacitor are coupled in parallel to form a total storage capacitor of the array substrate to increase the total storage capacitor of the array substrate, so as to avoid the issues of the cross talk and the image residue due to the over small total storage capacitor for promoting the quality of the array substrate. The present invention further discloses a display panel utilizing the array substrate and a liquid crystal display panel utilizing the array substrate.

20 Claims, 3 Drawing Sheets

(52) U.S. Cl.
CPC .. *G02F 1/136227* (2013.01); *G02F 1/136286* (2013.01); *G02F 1/134363* (2013.01); *G02F 2001/13685* (2013.01); *G02F 2201/121* (2013.01); *G02F 2201/123* (2013.01); *G02F 2202/104* (2013.01)

(58) Field of Classification Search
CPC ........... G02F 1/136204; H01L 27/1251; H01L 27/1255
See application file for complete search history.

(56) References Cited

U.S. PATENT DOCUMENTS

| | | | |
|---|---|---|---|
| 2008/0246042 A1 | 10/2008 | Ting | |
| 2012/0013839 A1* | 1/2012 | Katsumoto | ......... G02F 1/13394 349/139 |
| 2013/0334533 A1* | 12/2013 | Yamazaki | ........... H01L 29/7869 257/57 |
| 2014/0054592 A1* | 2/2014 | Gu | .................... G02F 1/134363 257/71 |
| 2014/0204301 A1* | 7/2014 | Nakagawa | ........ G02F 1/136204 349/42 |
| 2017/0207251 A1* | 7/2017 | Liu | .................... H01L 27/1222 |

FOREIGN PATENT DOCUMENTS

| | | |
|---|---|---|
| CN | 102236222 A | 11/2011 |
| CN | 103296030 A | 9/2013 |

\* cited by examiner

ARRAY SUBSTRATE, DISPLAY PANEL AND LIQUID CRYSTAL DISPLAY DEVICE

CROSS REFERENCE

This application claims the priority of Chinese Patent Application No. 201610098282.2, entitled "Array substrate, display panel and liquid crystal display device", filed on Feb. 23, 2016, the disclosure of which is incorporated herein by reference in its entirety.

FIELD OF THE INVENTION

The present invention relates to a display technology field, and more particularly to an array substrate, a display panel and a liquid crystal display device.

BACKGROUND OF THE INVENTION

With the constant development of the TFT (Thin Film Transistor) liquid crystal display technology, the TFT display device based on LTPS (Low Temperature Poly-silicon) skill possessing properties of low power consumption, high resolution, fast response speed and high aperture ratio has already become the mainstream, and widely applied in kinds of electronic apparatuses, like being applied in the digital electronic apparatuses, such as liquid crystal television, smart phone, tablet and digital camera.

However, the mobile display technology has been developed for higher quality, the finer degree, thinner body and lower power consumption. As the resolution gets higher and higher, the aperture ratio of the product becomes smaller. Meanwhile, the storage capacitor Cst (constructed by the pixel electrode, the common electrode and the passivation layer sandwiched therebetween) of the pixel gradually gets small, the charge duration of each pixel also gradually decreases. In the condition of prior art, for satisfying the requirement of optical quality and the transmission rate, it is difficult to make change to the thickness of the storage capacitor Cst and the area of the pixel electrode. Under such condition, the volume of the traditional storage capacitor Cst almost cannot be raised. The electrical quantity of each storage capacitor cannot maintain the normal working voltage of the pixel, and results in the issues of the cross talk and the Image Sticking, which tremendously lower the qualities of the array substrate and the display panel.

SUMMARY OF THE INVENTION

An objective of the present invention is to provide an array substrate for solving the technical issue that the quality of the array substrate is lower due to the storage capacitor is smaller in prior art.

Besides, the present invention further provides a display panel utilizing the array substrate.

Moreover, the present invention further provides a liquid crystal display panel utilizing the array substrate.

For realizing the aforesaid objective, the technical solution utilized by the embodiments of the present invention is:

First, provided is an array substrate, comprising:
a substrate;
forming a first common electrode on the substrate;
a buffer layer covering the first common electrode;
an active layer formed on a surface of the buffer layer away from the first common electrode, and the active layer comprises a first portion oppositely located to the first common electrode, and the first common electrode, the first portion and the buffer layer sandwiched between the first common electrode and the first portion construct a first storage capacitor;

a gate isolation layer covering the active layer;
a dielectric layer formed on a surface of the gate isolation layer away from the active layer, and a first hole is opened both in the gate isolation layer and the dielectric layer, and the first hole is employed to partially expose the first portion;
a drain region formed on a surface of the dielectric layer away from the gate isolation layer, and the drain region is connected to the first portion through the first hole;
a flat layer covering the drain region, and a second hole, which is employed to partially expose the drain region, is opened in the flat layer; and
a second common electrode, a passivation layer and a pixel electrode which are sequentially formed on the flat layer, and the second common electrode, the pixel electrode and the passivation layer sandwiched between the pixel electrode and the second common electrode construct a second storage capacitor, and the pixel electrode is connected to the drain region through the second hole.

The active layer further comprises a second portion connected to the first portion, and the array substrate comprises a gate region, and the gate region is formed between the gate isolation layer and the dielectric layer, and the gate region is located right opposite to the second portion.

The array substrate further comprises a light shielding layer formed on the substrate, and the light shielding layer and the first common electrode are located at the same layer and separately, and the light shielding layer is located opposite to the gate region.

The array substrate further comprises an ohm contact layer, and the ohm contact layer is located between the first portion and the drain region, and is employed to reduce a contact resistance between the first portion and the drain region.

The ohm contact layer comprises a lightly doped region and a heavily doped region, and the lightly doped region contacts with the first portion, and the heavily doped region is connected between the lightly doped region and the drain region, and a dosage concentration of the lightly doped region is smaller than a dosage concentration of the lightly doped region.

The passivation layer covers the second common electrode and is connected to the drain through the second hole, and a third hole, which is employed to partially expose the drain region, is opened in the passivation layer.

The dielectric layer comprises a first sub dielectric layer and a second sub dielectric layer which are stacked up, and the first sub dielectric layer is located between the gate isolation layer and second sub dielectric layer.

Material of the first common electrode is a transparent conductive thin film layer.

On the other hand, further provided is a display panel, comprises any one of the aforesaid array substrates.

Moreover, further provided is a liquid crystal device, comprising any one of the aforesaid array substrates.

Compared with prior art, the present invention possesses benefits below:

In the array substrate of the present invention, because the pixel electrode is electrically connected to the first portion of the active layer through the drain region, the first storage capacitor Cst1 and the second storage capacitor Cst2 are coupled in parallel to form a total storage Cst of the array substrate, and Cst=Cst1+Cst2, and thus to increase the total storage capacitor Cst of the array substrate, so as to avoid the issues of the cross talk and the Image Sticking due to the over small total storage capacitor Cst for promoting the quality of the array substrate.

Meanwhile, because the first common electrode is located opposite to the first portion of the active layer, and the active layer is generally located in the black matrix of the array substrate, the first common electrode is similarly located in the black matrix of the array substrate, and the location of the first common electrode does not influence the aperture ratio of the product utilizing the array substrate.

Moreover, the first common electrode is electrically connected to the second common electrode and the pixel electrode is electrically connected to the first portion of the active layer, the first storage capacitor Cst1 and the second storage capacitor Cst2 are equipotential, and meanwhile, the charge and discharge operation of the second storage capacitor Cst2 is controllable, and thus, the charge and discharge operation of the first storage capacitor Cst1 is similarly controllable. Thus, under the premise that the array substrate increase the total storage capacitor Cst in the present invention, the charge and discharge operation of the first storage capacitor Cst1 added in the array substrate is controllable and stable. Moreover, the components of the first storage capacitor Cst1 and the second storage capacitor Cst2 are individually and independently located, which is also beneficial to make the first storage capacitor Cst1 and the second storage capacitor Cst2 more stable and more reliable in the operation.

In the display panel and the liquid crystal display device of this embodiment, because the array substrate is utilized, the total storage capacitor Cst of the array substrate can be increased under circumstance that the aperture ratio of the display is not reduced, so as the display panel can avoid the issues of the cross talk and the Image Sticking due to the over small total storage capacitor Cst to promote the quality of the display panel.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
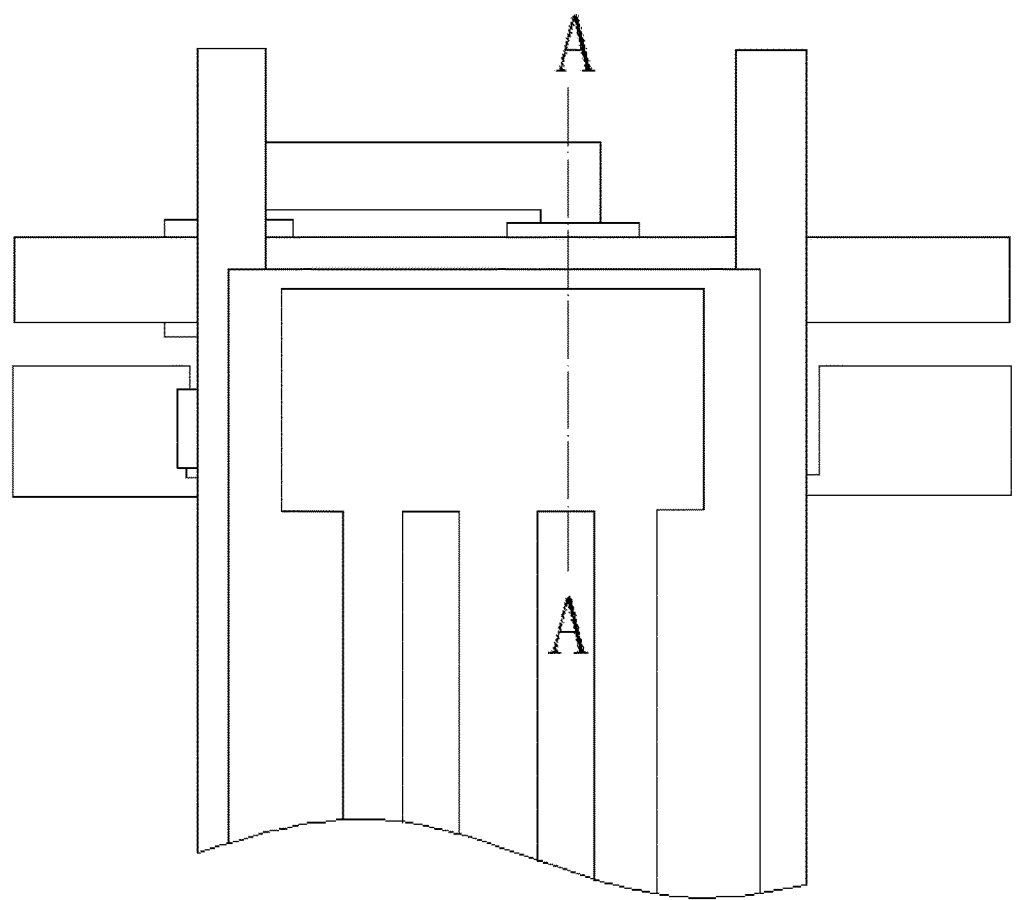
FIG. 1 is a structure diagram of an array substrate provided by the embodiment of the present invention.
Figure 2:
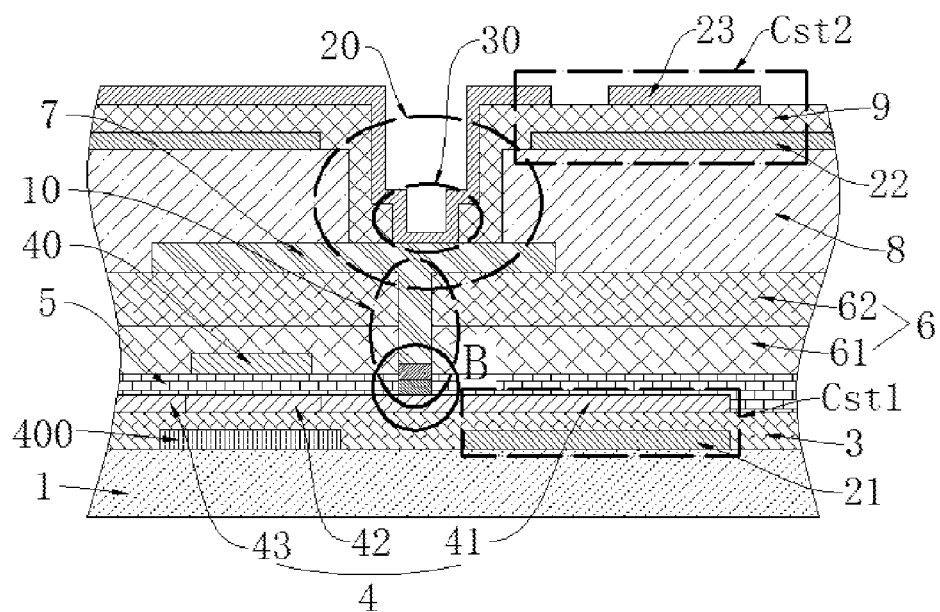
FIG. 2 is a partial structure diagram of the structure at A-A position in FIG. 1.
Figure 3:
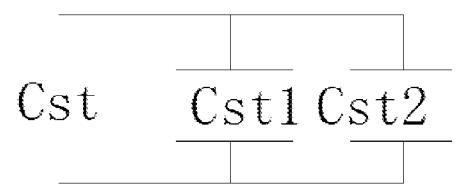
FIG. 3 is a diagram of partial circuit relationship of an array substrate provided by the embodiment of the present invention.

Please refer from FIG. 1 to FIG. 3. The embodiment of the present invention provides an array substrate, comprising:
a substrate 1;
forming a first common electrode 21 on the substrate 1;
a buffer layer 3 covering the first common electrode 21;
an active layer 4 formed on a surface of the buffer layer 3 away from the first common electrode 21, and the active layer 3 comprises a first portion 41 oppositely located to the first common electrode 21, and the first common electrode 21, the first portion 41 and the buffer layer 3 sandwiched between the first common electrode 21 and the first portion 41 construct a first storage capacitor Cst1;
a gate isolation layer 5 covering the active layer 4;
a dielectric layer 6 formed on a surface of the gate isolation layer 5 away from the active layer 4, and a first hole 10 is opened both in the gate isolation layer 5 and the dielectric layer 6, and the first hole 10 is employed to partially expose the first portion 41;
a drain region 7 formed on a surface of the dielectric layer 6 away from the gate isolation layer 5, and the drain region 7 is connected to the first portion 41 through the first hole 10;
a flat layer 8 covering the drain region 7, and a second hole 20, which is employed to partially expose the drain region 7, is opened in the flat layer 8; and
a second common electrode 22, a passivation layer 9 and a pixel electrode 23 which are sequentially formed on the flat layer 8, and the second common electrode 22, the pixel electrode 23 and the passivation layer 9 sandwiched between the pixel electrode 23 and the second common electrode 22 construct a second storage capacitor Cst2, and the pixel electrode 23 is connected to the drain region 7 through the second hole 20.

In the embodiment, because the pixel electrode 23 is electrically connected to the first portion 41 of the active layer 4 through the drain region 7, the first storage capacitor Cst1 and the second storage capacitor Cst2 are coupled in parallel to form a total storage Cst of the array substrate, and Cst=Cst1+Cst2 (as shown in FIG. 3), and thus to increase the total storage capacitor Cst of the array substrate, so as to avoid the issues of the cross talk and the Image Sticking due to the over small total storage capacitor Cst for promoting the quality of the array substrate.

Meanwhile, because the first common electrode 21 is located opposite to the first portion 41 of the active layer 4, and the active layer 4 is generally located in the black matrix of the array substrate, the first common electrode 21 is similarly located in the black matrix of the array substrate, and the location of the first common electrode 21 does not influence the aperture ratio of the product utilizing the array substrate.

It should be understood that in this embodiment, in this embodiment, the first common electrode 21 is electrically connected to the second common electrode 22 (both are a portion of the common electrode in the array substrate), and the pixel electrode 23 is electrically connected to the first portion 41 of the active layer 4, the first storage capacitor Cst1 and the second storage capacitor Cst2 are equipotential, and meanwhile, the charge and discharge operation of the second storage capacitor Cst2 is controllable, and thus, the charge and discharge operation of the first storage capacitor Cst1 is similarly controllable. Thus, under the premise that the array substrate increase the total storage capacitor Cst in this embodiment, the charge and discharge operation of the first storage capacitor Cst1 added in the array substrate is controllable and stable. Moreover, the components of the first storage capacitor Cst1 and the second storage capacitor Cst2 are individually and independently located, which is also beneficial to make the first storage capacitor Cst1 and the second storage capacitor Cst2 more stable and more reliable in the operation.

Furthermore, referring to FIG. 2, the active layer 4 further comprises a second portion 42 and a third portion 43, and one end of the second portion 42 is connected to the first portion 41, and the other end of the second portion 42 is connected to the third portion 43. The array substrate comprises a gate region 40, and the gate region 40 is formed between the gate isolation layer 5 and the dielectric layer 6, and the gate region 40 is located right opposite to the second portion 42.

Furthermore, referring to FIG. 2, the array substrate further comprises a light shielding layer 400 formed on the substrate 1, and the light shielding layer 400 and the first common electrode 21 are located at the same layer and separately, and the light shielding layer 400 is located opposite to the gate region 40. The light shielding layer 400 is employed for shielding the Thin Film Transistor (TFT) formed on the array substrate to reduce the influence of the backlight source to the thin film transistor. Material of the light shielding layer 400 is generally selected from metal materials, such as an aluminum layer, a tungsten layer, a chromium layer or a conductive layer of other metals or metallic compounds. It should be understood that the light shielding layer 400 also can utilize the isolation material, and thus to prevent that the gate region 40 and the gate isolation layer 5 sandwiched between the gate region 40 and the light shielding layer 400 construct a parasitic capacitance for avoiding the leakage current.

Specifically, the semiconductor layer (i.e. the active layer 4) utilizes the top gate type TFT of polysilicon for explanation in the embodiment according to the present invention. For the semiconductor layer (i.e. the active layer 4) which utilizes the TFT of amorphous silicon, the embodiment according to the present invention can be similarly applied thereto.

Figure 4:
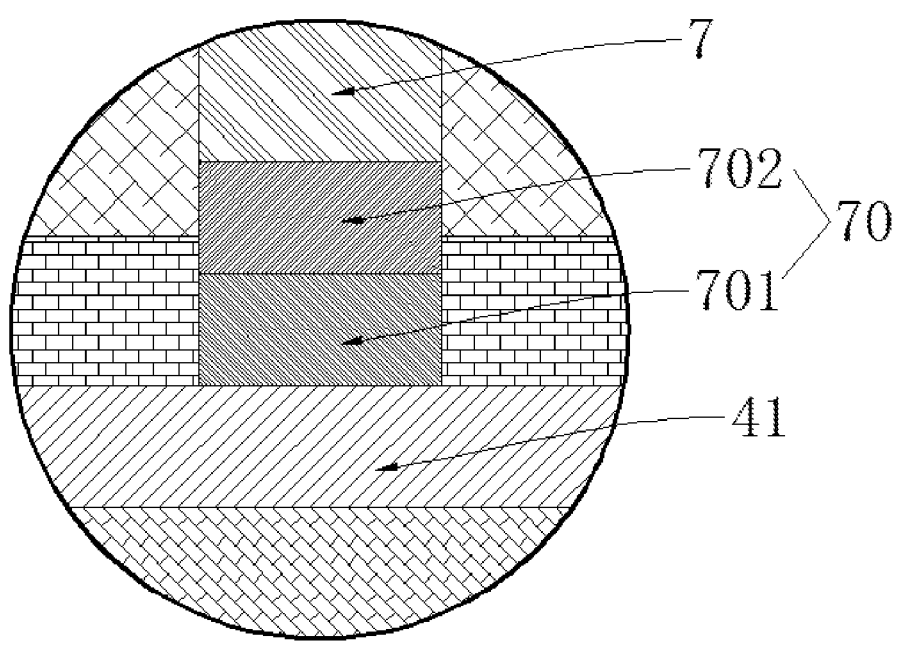
FIG. 4 is an enlarged diagram of the structure of the B position in FIG. 2.

Furthermore, referring to FIG. 2 and FIG. 4, together, the array substrate further comprises an ohm contact layer 70, and the ohm contact layer 70 is located between the first portion 41 and the drain region 7, and is employed to reduce a contact resistance between the first portion 41 and the drain region 7. As being one preferred embodiment, the ohm contact layer 70 can be formed inside the first hole 10.

Furthermore, referring to FIG. 2 and FIG. 4, the ohm contact layer 70 comprises a lightly doped region 701 and a heavily doped region 702, and the lightly doped region 701 contacts with the first portion 41, and the heavily doped region 702 is connected between the lightly doped region 701 and the drain region 7, and a dosage concentration of the lightly doped region 701 is smaller than a dosage concentration of the lightly doped region 702. The ion types of the lightly doped region 701 and the lightly doped region 702 are the same. For instance, both can be the N type ion doping. In this embodiment, the location of the lightly doped region 701 and the lightly doped region 702 cannot only reduce the contact resistance between the drain region 7 and the active layer 4, and also can reduce the current leakage risk.

Furthermore, referring to FIG. 2, the passivation layer 9 covers the second common electrode 22 and is connected to the drain region 7 through the second hole 20, and a third hole 30, which is employed to partially expose the drain region 7, is opened in the passivation layer 9. The third hole 30 is formed in the region of the second hole 20 so that the pixel electrode 23 can be connected to the drain region 7 smoothly through the third hole 30.

Furthermore, referring to FIG. 2, the dielectric layer 6 comprises a first sub dielectric layer 61 and a second sub dielectric layer 62 which are stacked up, and the first sub dielectric layer 61 is located between the gate isolation layer 5 and second sub dielectric layer 62. Material of the first sub dielectric layer 61 is silicon oxide (SiOx) material, which can improve the stress of the first sub dielectric layer 61 to prevent the peel of the first sub dielectric layer 61; material of the second sub dielectric layer 62 is silicon nitride (SiNx) material, which can generate Helium (H) elements for repairing the active layer 4 as manufacturing the silicon nitride material to raise the electrical performance of the active layer 4.

Furthermore, the buffer layer 3 in the embodiment comprises a first sub buffer layer and a second sub buffer layer. The first sub buffer layer is closer to the substrate 1 than the second sub buffer layer, and the first sub buffer layer uses the silicon nitride (SiNx) material, and the second sub buffer layer uses the silicon oxide (SiOx) material. The arrangement of the first sub buffer layer and the second sub buffer layer can better buffer the damage to the substrate 1 in the manufacture process of the array substrate. Besides, the first sub buffer layer uses the silicon nitride (SiNx) material, which can generate Helium (H) elements for repairing the active layer 4 as manufacturing the silicon nitride material to raise the electrical performance of the active layer 4. The second sub buffer layer uses the silicon oxide material, which is employed to improve the stress of the second sub buffer layer to prevent the peel of the second sub buffer layer.

Furthermore, material of the first common electrode 21 is a transparent conductive thin film layer, and preferably, the first common electrode 21 utilizes Indium tin oxide (ITO). Then, even the first common electrode 21 is positioned outside the black matrix region of the array substrate, it will not influence the aperture ratio of the product utilizing the array substrate. In this embodiment, both materials of the second common electrode 22 and the pixel electrode 23 are transparent conductive thin film layers, and preferably to be Indium tin oxide.

Moreover, the flat layer 8 can be an isolation layer formed with inorganic material or an isolation layer formed with organic material. Preferably, it can be manufactured with organic resin material, and the organic resin can be benzocyclobutene (BMB), or can be other organic photosensitive material. The embodiment of the invention does not make any limit thereto. Because the hardness of the organic resin is smaller than that of the inorganic material, which is more beneficial to make the evenness for the surface of the array substrate, and is beneficial for the formation of the second common electrode 22 and the pixel electrode 23 thereafter and the ideal alignment of the liquid crystal molecules between the color filter substrate and the array substrate.

The embodiment of the present invention further provides a display panel, comprising an array substrate, a color filter substrate and a liquid crystal layer located between the array substrate and the color filter substrate, and the array substrate utilizes the array substrates in the aforesaid embodiments. Generally, the display mode of the display panel is Fringe Field Switching (FFS), and FFS is the wide view angle technology developed for the application of the large scale, high resolution liquid crystal display devices, which is also named as hard screen technology.

In the display panel of this embodiment, because the array substrate in the aforesaid embodiment is utilized, the total storage capacitor Cst of the array substrate can be increased under circumstance that the aperture ratio of the display is not reduced, so as the display panel can avoid the issues of the cross talk and the Image Sticking due to the over small total storage capacitor Cst to promote the quality of the display panel.

Moreover, the embodiment of the present invention further provides a liquid crystal device, comprising any one of the aforesaid array substrates. The total storage capacitor Cst of the liquid crystal display device is larger to avoid the issues of the cross talk and the Image Sticking due to the over small total storage capacitor Cst, and the quality is higher.

The detail description has been introduced above for the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. An array substrate, comprising:
    a substrate;
    forming a first common electrode on the substrate;
    a buffer layer covering the first common electrode;
    an active layer formed on a surface of the buffer layer away from the first common electrode, and the active layer comprises a first portion oppositely located to the first common electrode, and the first common electrode, the first portion and the buffer layer sandwiched between the first common electrode and the first portion construct a first storage capacitor;
    a gate isolation layer covering the active layer;
    a dielectric layer formed on a surface of the gate isolation layer away from the active layer, and a first hole is opened both in the gate isolation layer and the dielectric layer, and the first hole is employed to partially expose the first portion;
    a drain region formed on a surface of the dielectric layer away from the gate isolation layer, and the drain region is connected to the first portion through the first hole;
    a flat layer covering the drain region, and a second hole, which is employed to partially expose the drain region, is opened in the flat layer; and
    a second common electrode, a passivation layer and a pixel electrode which are sequentially formed on the flat layer, and the second common electrode, the pixel electrode and the passivation layer sandwiched between the pixel electrode and the second common electrode construct a second storage capacitor, and the pixel electrode is connected to the drain region through the second hole.

2. The array substrate according to claim 1, wherein the active layer further comprises a second portion connected to the first portion, and the array substrate comprises a gate region, and the gate region is formed between the gate isolation layer and the dielectric layer, and the gate region is located right opposite to the second portion.

3. The array substrate according to claim 2, wherein the array substrate further comprises a light shielding layer formed on the substrate, and the light shielding layer and the first common electrode are located at the same layer and separately, and the light shielding layer is located opposite to the gate region.

4. The array substrate according to claim 1, wherein the array substrate further comprises an ohm contact layer, and the ohm contact layer is located between the first portion and the drain region, and is employed to reduce a contact resistance between the first portion and the drain region.

5. The array substrate according to claim 4, wherein the ohm contact layer comprises a lightly doped region and a heavily doped region, and the lightly doped region contacts with the first portion, and the heavily doped region is connected between the lightly doped region and the drain region, and a dosage concentration of the lightly doped region is smaller than a dosage concentration of the lightly doped region.

6. The array substrate according to claim 1, wherein the passivation layer covers the second common electrode and is connected to the drain through the second hole, and a third hole, which is employed to partially expose the drain region, is opened in the passivation layer.

7. The array substrate according to claim 1, wherein the dielectric layer comprises a first sub dielectric layer and a second sub dielectric layer which are stacked up, and the first sub dielectric layer is located between the gate isolation layer and second sub dielectric layer.

8. The array substrate according to claim 1, wherein material of the first common electrode is a transparent conductive thin film layer.

9. A display panel, comprising an array substrate, and the substrate comprises:
    a substrate;
    forming a first common electrode on the substrate;
    a buffer layer covering the first common electrode;
    an active layer formed on a surface of the buffer layer away from the first common electrode, and the active layer comprises a first portion oppositely located to the first common electrode, and the first common electrode, the first portion and the buffer layer sandwiched between the first common electrode and the first portion construct a first storage capacitor;
    a gate isolation layer covering the active layer;
    a dielectric layer formed on a surface of the gate isolation layer away from the active layer, and a first hole is opened both in the gate isolation layer and the dielectric layer, and the first hole is employed to partially expose the first portion;
    a drain region formed on a surface of the dielectric layer away from the gate isolation layer, and the drain region is connected to the first portion through the first hole;
    a flat layer covering the drain region, and a second hole, which is employed to partially expose the drain region, is opened in the flat layer; and
    a second common electrode, a passivation layer and a pixel electrode which are sequentially formed on the flat layer, and the second common electrode, the pixel electrode and the passivation layer sandwiched between the pixel electrode and the second common electrode construct a second storage capacitor, and the pixel electrode is connected to the drain region through the second hole.

10. The display panel according to claim 9, wherein the active layer further comprises a second portion connected to the first portion, and the array substrate comprises a gate region, and the gate region is formed between the gate isolation layer and the dielectric layer, and the gate region is located right opposite to the second portion.

11. The display panel according to claim 10, wherein the array substrate further comprises a light shielding layer formed on the substrate, and the light shielding layer and the first common electrode are located at the same layer and separately, and the light shielding layer is located opposite to the gate region.

12. The display panel according to claim 9, wherein the array substrate further comprises an ohm contact layer, and the ohm contact layer is located between the first portion and the drain region, and is employed to reduce a contact resistance between the first portion and the drain region.

13. The display panel according to claim 12, wherein the ohm contact layer comprises a lightly doped region and a heavily doped region, and the lightly doped region contacts with the first portion, and the heavily doped region is connected between the lightly doped region and the drain region, and a dosage concentration of the lightly doped region is smaller than a dosage concentration of the lightly doped region.

14. The display panel according to claim 9, wherein the passivation layer covers the second common electrode and is connected to the drain through the second hole, and a third hole, which is employed to partially expose the drain region, is opened in the passivation layer.

15. The display panel according to claim 9, wherein the dielectric layer comprises a first sub dielectric layer and a second sub dielectric layer which are stacked up, and the first sub dielectric layer is located between the gate isolation layer and second sub dielectric layer.

16. The display panel according to claim 9, wherein material of the first common electrode is a transparent conductive thin film layer.

17. A display panel, comprising an array substrate, and the substrate comprises:
a substrate;
forming a first common electrode on the substrate;
a buffer layer covering the first common electrode;
an active layer formed on a surface of the buffer layer away from the first common electrode, and the active layer comprises a first portion oppositely located to the first common electrode, and the first common electrode, the first portion and the buffer layer sandwiched between the first common electrode and the first portion construct a first storage capacitor;
a gate isolation layer covering the active layer;
a dielectric layer formed on a surface of the gate isolation layer away from the active layer, and a first hole is opened both in the gate isolation layer and the dielectric layer, and the first hole is employed to partially expose the first portion;
a drain region formed on a surface of the dielectric layer away from the gate isolation layer, and the drain region is connected to the first portion through the first hole;
a flat layer covering the drain region, and a second hole, which is employed to partially expose the drain region, is opened in the flat layer; and
a second common electrode, a passivation layer and a pixel electrode which are sequentially formed on the flat layer, and the second common electrode, the pixel electrode and the passivation layer sandwiched between the pixel electrode and the second common electrode construct a second storage capacitor, and the pixel electrode is connected to the drain region through the second hole.

18. The liquid crystal display device according to claim 17, wherein the active layer further comprises a second portion connected to the first portion, and the array substrate comprises a gate region, and the gate region is formed between the gate isolation layer and the dielectric layer, and the gate region is located right opposite to the second portion.

19. The liquid crystal display device according to claim 18, wherein the array substrate further comprises a light shielding layer formed on the substrate, and the light shielding layer and the first common electrode are located at the same layer and separately, and the light shielding layer is located opposite to the gate region.

20. The liquid crystal display device according to claim 17, wherein the passivation layer covers the second common electrode and is connected to the drain through the second hole, and a third hole, which is employed to partially expose the drain region, is opened in the passivation layer.

* * * * *